United States Patent [19]

Ingall et al.

[11] Patent Number: 5,360,961
[45] Date of Patent: Nov. 1, 1994

[54] METHOD OF WELDING

[75] Inventors: Robert C. Ingall, Leicestershire; Julie Waumsley, Derby, both of England

[73] Assignee: Rolls-Royce plc, London, England

[21] Appl. No.: 975,567

[22] PCT Filed: Aug. 1, 1991

[86] PCT No.: PCT/GB91/01311
§ 371 Date: Feb. 5, 1993
§ 102(e) Date: Feb. 5, 1993

[87] PCT Pub. No.: WO92/05908
PCT Pub. Date: Apr. 16, 1992

[30] Foreign Application Priority Data

Sep. 29, 1990 [GB] United Kingdom ............ 9021237.4

[51] Int. Cl.5 ............................................. B23K 9/073
[52] U.S. Cl. .......................... 219/137 PS; 219/130.51
[58] Field of Search .... 219/137 R, 137 WM, 137 PS, 219/130.51; 427/405

[56] References Cited

U.S. PATENT DOCUMENTS 2,697,160 12/1954 Williams .
3,068,352 12/1962 Correy ...................... 219/137 PS
4,180,720 12/1979 Barhorst .
4,219,592 8/1980 Anderson et al. ................... 427/405
4,861,965 8/1989 Stava .
4,904,843 2/1990 Hori et al. ...................... 219/130.51

FOREIGN PATENT DOCUMENTS 0316936 5/1989 European Pat. Off. .
2272259 12/1975 France .
951222 4/1964 United Kingdom .
1152508 5/1969 United Kingdom .

*Primary Examiner*—Clifford C. Shaw
*Attorney, Agent, or Firm*—Cushman, Darby & Cushman

[57] ABSTRACT

A method of welding comprises forming an alternating current electric arc between an electrode (32) of a tungsten inert gas welding torch (30) and a metallic substrate (10). The alternating current has a square wave form (10). The alternating current has a square wave form which is self supporting and does not require intercycle high frequency support. The square wave alternating current has a wave bias ratio equal to or greater than 90% forward current to 10% reverse current. A metal welding rod (38) is supplied into the electric arc for depositing a weld deposit (40) on the metallic substrate (10). The welding method is used to apply a metallic wear resistant coating (40) to an edge surface (20 or 22) on a shroud (18) of a turbine blade (10) and is used to seal a cooling passage of a turbine blade or turbine vane.

25 Claims, 2 Drawing Sheets

METHOD OF WELDING

The present invention is concerned with a method of welding and includes a method of applying a metallic wear resistant coating to a metallic substrate, and is particularly concerned with applying a metallic wear resistant coating to an edge surface on a turbine blade shroud, and further includes a method of sealing a hole in a metallic substrate, for example a cooling passage in turbine blade or turbine vane.

It is known to supply metal into an electric arc formed between an electrode of a welding torch and a metallic substrate for depositing a weld deposit on the metallic substrate. It is also known to deposit a weld deposit on the metallic substrate to form a metallic wear resistant coating which is metallurgically bonded to the metallic substrate.

Conventionally the electric arc is a direct current electric arc. The use of the conventional direct current electric arc results in penetration of the electric arc into the metallic substrate causing elements in the metallic substrate to diffuse into the weld deposit with a consequential softening of the weld deposit. In order to overcome the softening of the weld deposit used as wear resisted coatings, it is known to deposit a first weld layer on the metal substrate, allow the weld deposit to cool, machine the first weld layer and then deposit a second weld layer on the first weld layer.

The conventional method of applying a metallic wear resistant coating to a metallic substrate is laborious and costly.

The present invention seeks to provide a novel method of welding, a novel method of applying a wear resistant coating to a metallic substrate which overcomes the above problems and a novel method of sealing a hole in a metallic substrate.

Accordingly the present invention provides a method of welding comprising forming an alternating current electric arc between an electrode and a metallic substrate, the alternating current having a square wave form, supplying metal into the electric arc for depositing a weld deposit on the metallic substrate, the square wave alternating current electric arc being self supporting and not requiring intercycle high frequency support, the square wave alternating current having a wave bias ratio equal to or greater than 90% normal current to 10% reverse current, The wave bias ratio may be greater than 95% normal current to 5% reverse current.

The wave bias ratio may be greater than 96% normal current to 4% reverse current.

Preferably the wave bias ratio is 97.6% normal current to 2.4% reverse current, or is 98% normal current to 2% reverse current.

The wave bias ratio may be less than 99.5% normal current to 0.5% reverse current.

Preferably the alternating current has a frequency greater than 50 Hertz.

The alternating current may have a frequency less than 200 Hertz.

The amperage of the alternating current may be in the range of 1 to 50 amps.

Preferably the alternating current electric arc is formed between a non consumable electrode of a tungsten inert gas welding torch and the metallic substrate.

Preferably the metal is supplied into the electric arc 30 by a solid consumable metal welding member.

The metallic substrate may be a first portion of laminated material, the first portion of laminated material is welded to a second portion of laminated material.

The weld deposit may form a metallic wear resistant coating on the metallic substrate, the coating being metallurgically bonded to the metallic substrate.

The metallic substrate may be a metallic substrate of a turbine blade.

The metallic substrate may be the shroud of the turbine blade, the weld deposit is deposited on an edge surface of the shroud.

The metallic substrate may be premachined before the weld is deposited on the metallic substrate.

The thickness of the weld deposit might be at least 1.0 mm.

Preferably the thickness of the weld deposit is 1.8 mm.

The metallic substrate may comprise nickel or a nickel alloy.

The weld deposit may comprise a cobalt alloy.

The metallic substrate may be a previously applied weld deposit on a turbine blade, the weld deposit is deposited on the previously applied weld deposit.

The previously applied weld deposit may be an edge of the shroud of a turbine blade, the weld deposit is deposited on the previously deposited weld deposit.

The previously applied weld deposit may be applied to the turbine blade by forming a first electric arc between an electrode and the turbine blade, supplying metal into the first electric arc for depositing a first weld deposit on the turbine blade.

The turbine blade may be premachined before the first weld deposit is deposited on the turbine blade.

The thickness of the first weld deposit is at least 0.4 mm. The total thickness of the first weld deposit and the weld deposit is at least 1.0 mm. Preferably the total thickness of the first weld deposit and the weld deposit is 1.8 mm.

The electric arc between the first electrode and the turbine blade may be an alternating current electric arc.

The weld deposit may seal a hole in the metallic substrate, the weld deposit being metallurgically bonded to the metallic substrate.

The metallic substrate may comprise a turbine blade or turbine vane having cooling passages, the cooling passages being sealed by the weld deposit.

The turbine blade or turbine vane may comprise nickel or nickel alloy and the metal welding member comprises nickel or nickel alloy.

The present invention will be more fully described by way of example with reference to the accompanying drawings, in which.

Figure 1:
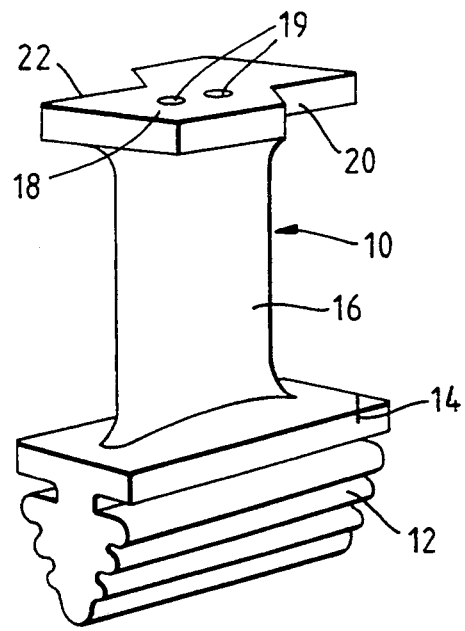
FIG. 1 is a perspective view of a shrouded turbine blade having a metallic wear resistant coating applied in accordance with the present invention.

A gas turbine engine turbine blade 10, shown in FIG. 1, comprises a root 12, a platform 14, an aerofoil 16 and a shroud 18. The root 12 has a firtree shape for attachment of the turbine blade 10 to a suitably shaped groove of a turbine rotor (not shown). The shroud 18 has edges 20 and 22 which, when the turbine blade 10 is located on a turbine rotor, abut with the correspondingly shaped edges of shrouds of adjacent turbine blades. The edges 20 and 22 of the shrouds 18 of adjacent turbine blades 10 are arranged to interlock such that in operation the edges 20 and 22 of adjacent turbine blades 10 rub together to damp vibrations of the turbine blades. The edges 20 and 22 are conventionally provided with wear resistant coatings to minimise damage to the edges 20 and 22 of the shrouds 18. The turbine blades 10 are generally cast from a nickel base alloy and cobalt base wear resistant coatings are generally applied to the edges of the shrouds. The shroud 18 of the turbine blade 10 also has open cooling passages 19 in which ceramic cores were located during the casting process to define the cooling passages of the turbine blade. The ceramic cores have been subsequently removed.

As mentioned previously the direct current electric arc used for depositing a weld deposit of cobalt base alloy onto the nickel base alloy turbine blade shroud results in nickel diffusing from the turbine blade shroud into the cobalt base alloy weld deposit, producing an increase in the nickel content of the weld deposit and a consequential softening of the weld deposit. This resulted in a requirement to deposit a first weld layer on the edge of the shroud of the turbine blade, then to machine the first weld deposit, then to deposit a second weld layer on the first weld layer to ensure that the second weld layer was not softened by nickel migrating from the turbine blade shroud and finally to machine the second weld deposit to the desired shape.

Figure 2:
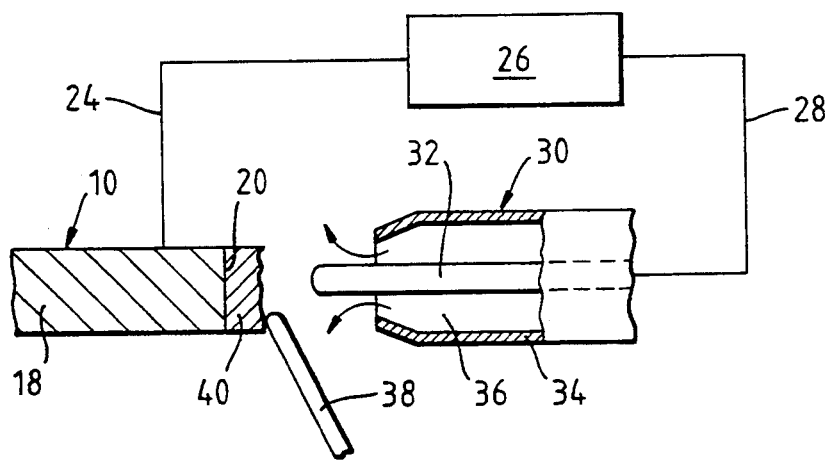
FIG. 2 illustrates a partial view of the turbine blade shroud having a metallic wear resistant coating being applied by a method in accordance with the present invention.

A metallic wear resistant coating 40, of a cobalt base alloy, is deposited on a metallic substrate, the nickel base alloy turbine blade shroud 18, using a method described with reference to FIG. 2. The turbine blade 10 is electrically connected via a cable 24 to one output of an alternating current source 26, and an electrode 32 of a tungsten inert gas welding torch 30 is electrically connected via a cable 28 to the second output of the alternating current source 26. The tungsten inert gas welding torch 30 has a shield 34 arranged coaxially around the electrode 32 to define an annular passage 36 for the supply of an inert gas to the welding zone of the welding torch 30.

In operation the alternating current source 26 supplies a square wave alternating current to the turbine blade 10 and the electrode 32 such that an alternating current electric arc is formed between one of the edges 20 and 22 of the turbine blade shroud 18 and the electrode 32. A welding rod 38 of cobalt base alloy is moved into the alternating current electric arc so that the welding rod 38 melts and deposits on the selected edge 20 or 22 to form a metallic wear resistant weld deposit 40 on the edge 20 or 22 of the shroud 18 which is metallurgically bonded to the edge 20 or 22 of the shroud 18. The weld deposit 40 is subsequently machined to the desired shape after the weld has cooled to room temperature.

Figure 4:
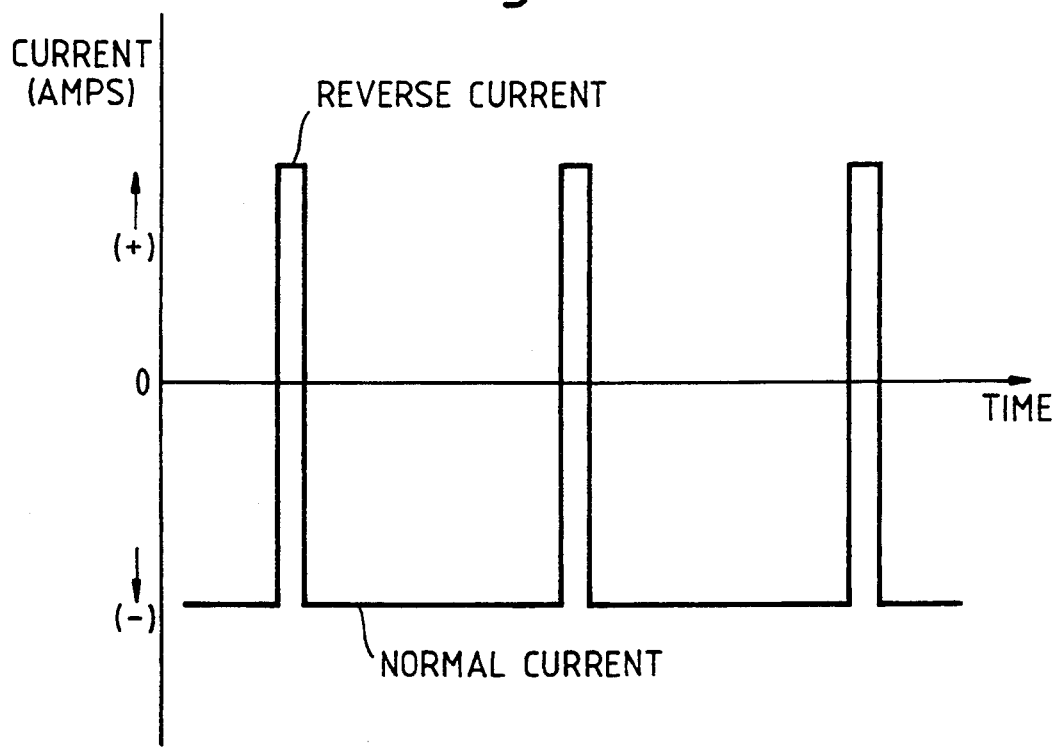
FIG. 4 is a graph of current versus time illustrating a square wave alternating current used by a method in accordance with the present invention.

The alternating current supplied by the alternating current source 26 is of square wave form, as shown in FIG. 4, and has a wave bias ratio greater than 90% normal or current to 10% reverse current. It is to be noted that a normal current flows when the electrode 32 is at a negative potential and the metallic substrate 10 is at a positive potential, and a reverse current flows when the electrode 32 is at a positive potential and the metallic substrate 10 is at a negative potential. With wave bias ratios less than 90% normal current to 10% reverse current, the electric arc becomes unstable, for nickel base alloys of the Nimonic type the wave bias ratio is maintained between ratios of 95% normal current to 5% reverse current and 99.5% normal current to 0.5% reverse current to prevent break down of the electric arc stability. The square wave form alternating current with bias ratios greater than 90% normal current to 10% reverse current produces a more stable electric arc than existing alternating current mains supply which typically have a 50% normal current to 50% reverse current wave bias ratio.

The alternating current is in the range of 1 to 50 amps. The alternating current arc is self supporting without any requirement to employ an electric arc starting device.

The alternating current used has a frequency greater than 50 Hertz and less than 200 Hertz, because at frequencies below this range the visual flickering of the arc is irritating to an operative and above this range the noise is irritating to an operative.

These parameters minimise penetration of the alternating current arc into the metallic substrate, produces less heat in the metallic substrate and minimises the diffusion of elements, e.g. nickel, from the metallic substrate into the cobalt wear resistant weld deposit and minimises any softening of the wear resistant coating. The use of an alternating current greater than 50 Hertz produces a more stable and controllable electric arc with reduced noise level. the reverse current produces a scavenging action on the metallic substrate and welding rod, which removes any oxide films, enabling the deposition of the weld deposit on an as cast turbine blade without the requirement for the edges of the shroud to be premachined. However the edges of the shroud may be premachined if desired.

The use of the above method produces more consistent weld deposited metallic wear resistant coatings on the edges of turbine blades shrouds, is less laborious and is less costly than the previous method.

Cobalt alloy has been deposited to a depth of between 1 mm and 1.8 mm on the nickel base turbine blade shroud.

It is possible to apply the weld deposit to any shape of edge of a turbine blade shroud.

Figure 3:
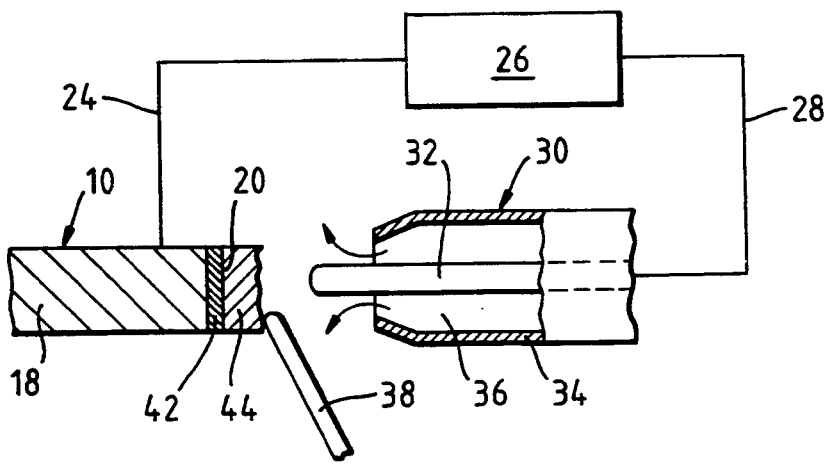
FIG. 3 illustrates a partial view of the turbine blade shroud having a metallic wear resistant coating being applied by a method in accordance with the present invention.

A metallic wear resistant coating 44, of a cobalt base alloy, is deposited on a metallic substrate, first weld deposit 42, using a method described with reference to FIG. 3.

In operation the first weld deposit 42 is applied to the edge 20 or 22 of the shroud 18 of the turbine blade 10. The first weld deposit 42 is applied by forming an electric arc between the edge 20 or 22 of the turbine blade shroud 18 and an electrode of a welding torch. A cobalt base alloy welding rod is moved into the electric arc so that the welding rod melts and the cobalt alloy deposits on the edge 20 or 22 of the shroud 18 to form the first weld deposit 42. The electric arc may be a direct current arc or an alternating current arc.

The first weld deposit 42 is allowed to cool to room temperature before the alternating current source 26 supplies a square wave alternating current to the first weld deposit 42 and electrode 32 such that an alternating current arc is formed between the first weld deposit 42 on the edge 20 or 22 and the electrode 32. The cobalt base alloy welding rod 38 is moved into the alternating current electric arc so that the welding rod 38 melts and the cobalt alloy deposits on the first weld deposit 42 to form a metallic wear resistant weld deposit 44 on the edge 20 or 22 of the shroud 18. The weld deposit 44 is then machined to the desired shape after it has cooled to room temperature. The alternating current supplied by the source 26 again has a square wave form with a wave bias ratio greater than 90% normal current to 10% reverse current.

A costly machining operation after the application of the first weld deposit 42 is not required in the second method of the present invention.

The first weld deposit 42 is at least 0.4 mm thick, the total thickness of the first weld deposit 42 and the wear resistant coating 44 is at least 1.0 mm after the final machining operation and preferably is 1.8 mm thick.

The alternating current source 26 may be used to provide a square wave alternating current with a wave bias ratio of greater than 90% normal current to 10% reverse current for applying the coating 42.

Figure 5:
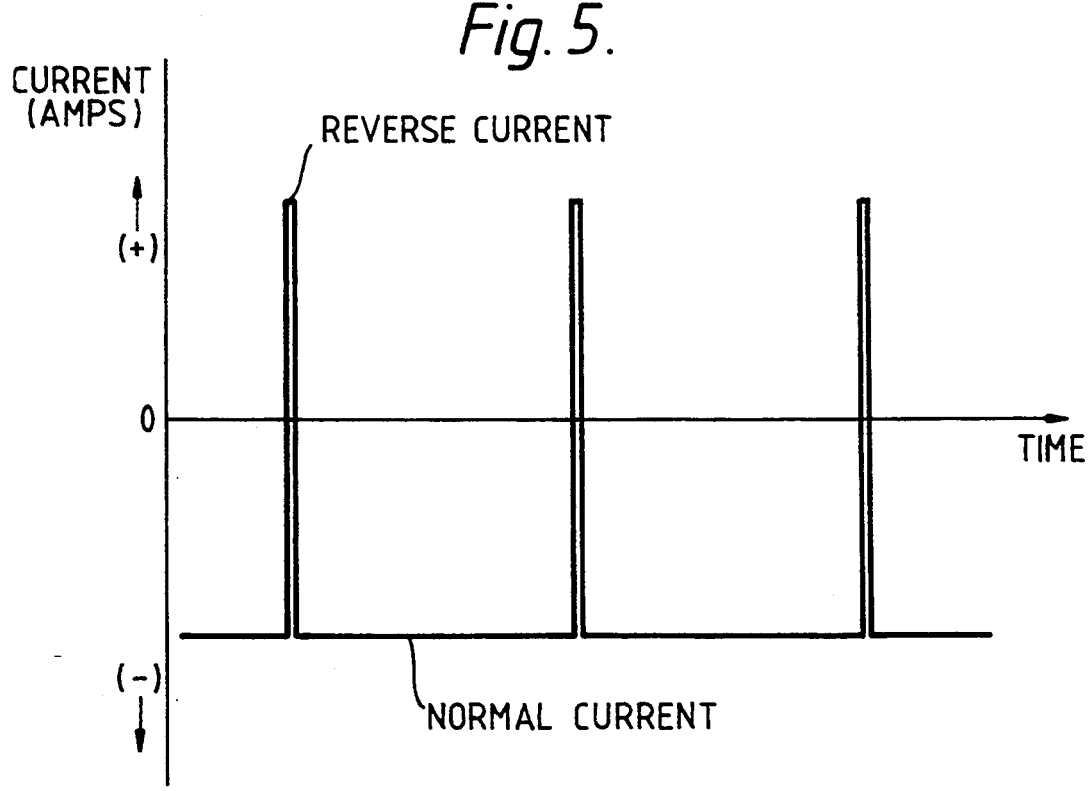
FIG. 5 is a graph of current versus time illustrating a square wave alternating current used by a preferred method in accordance with the present invention.

The alternating current supplied by the alternating current source 26 is preferably of square wave form, as shown in FIG. 5 and has a wave bias ratio in the range of 96% normal current to 4% reverse current to 99.5% normal current to 0.5% reverse current. The preferred values are wave bias ratios of 98% normal current to 2% reverse current and 97.6% normal current to 2.4% reverse current. FIG. 5 illustrates the wave bias ratio of 97.6% normal current to 2.4% reverse current.

We have achieved minimum current values of 5 amps and even down to values as low as 3 amps without loss of the electric arc and it is expected that further reductions in the minimum current value is achievable without loss of the electric arc.

It is to be noted that an alternating current electric arc exists for a brief period of time after the electric current reaches zero. Thereafter the alternating current electric arc is extinguished unless the electric arc is maintained. Conventionally the alternating current electric arc is maintained by a high frequency electric arc starting device. In the present invention the alternating current electric arc is self supporting because the alternating current has a square wave form which switches current direction at a sufficiently high rate to prevent the alternating current electric arc being extinguished.

In the present invention, the amplitude of the current, and the time duration of the normal and reverse currents are precisely controlled to control the total amount of energy imparted.

The present invention produces better wetting of the metallic substrate and hence produces better metallurgical joins than conventional welded joins.

The alternating current source 26 may be used to provide a square wave alternating current with a wave bias ratio of greater than 90% normal current to 10% reverse current for other welding operations. For example the turbine blade cooling passages 19 are sealed by using this method of welding. The cooling passages 19 are sealed by closing entirely with weld deposit, however in this case a suitable nickel base alloy welding rod is used to form a weld deposit. This welding method may be used to form wear resistant coatings, or close cooling holes, on single crystal turbine blades or turbine vanes because no recrystallisation or only minor recrystallisation of the single crystal material occurs. The welding method may be used to form wear resistant coatings on directionally solidified blades. The welding method is also suitable for repairing or overhauling turbine blades, turbine vanes or labyrinth seal members on various rotor or stator members, by building up oxidised or worn surfaces with minimum distortion. The welding method is also suitable for repairing casting defects. The welding method may be used to fabricate laminated material used in transpiration cooled combustion chamber walls of gas turbine engines by fusion welding pieces of the laminated material in abutting relationship.

Conventional D.C TIG welding of titanium requires that the titanium is cleaned before it is welded. The cleaning process comprises degreasing, rinsing in deionised water, ultrasonic degreasing, rinsing in deionised water, etaching with hydrofluoric/nitric acid, rinsing in deionised water and drying in nitrogen at an elevated temperature. All fixtures and the welding wire are also cleaned. The resulting weld still has an unacceptably high level of porosity.

Using the present invention the titanium substrate need only be degreased, the porosity of the weld is substantially eliminated. This welding process may be used to weld titanium vanes, or titanium blades or other suitable titanium structures. This is because of the cleaning action of the square wave alternating current.

We claim:

1. A method of welding comprising forming an alternating current electric arc between an electrode and a metallic substrate, the alternating current having a square wave form, supplying metal into the electric arc for depositing a weld deposit on the metallic substrate, characterized in that the square wave alternating current electric arc is self supporting and is free of intercycle high frequency support, the square wave alternating current has a wave bias ratio greater than 96% normal current to 4% reverse current.

2. A method as claimed in claim 1 in which the wave bias ratio is less than 99.5% normal current to 0.5% reverse current.

3. A method as claimed in claim 1 in which the wave bias ratio is 97.6% normal current to 2.4% reverse current.

4. A method as claimed in claim 1 in which the wave bias ratio is 98% normal current to 2% reverse current.

5. A method as claimed in claim 1 in which the alternating current has a frequency greater than 50 Hertz.

6. A method as claimed in claim 5 in which the alternating current has a frequency less than 200 Hertz.

7. A method as claimed in claim 1 in which the amperage of the alternating current is in the range of 1 to 50 amps.

8. A method as claimed in claim 1 in which the alternating current electric arc is formed between a non consumable electrode of a tungsten inert gas welding torch and the metallic substrate.

9. A method as claimed in claim 1 in which the metallic substrate is a first portion of a laminated material, the first portion of laminated material is welded to a second portion of laminated material.

10. A method as claimed in claim 1 in which the weld deposit forms a metallic wear resistant coating on the metallic substrate, the coating being metallurgically bonded to the metallic substrate.

11. A method as claimed in claim 10 in which the metallic substrate is a metallic substrate of a turbine blade.

12. A method as claimed in claim 11 in which the metallic substrate is the shroud of an as cast turbine blade, the weld deposit is deposited on an edge surface of the shroud.

13. A method as claimed in claim 10 in which the metallic substrate is premachined before the weld deposit is deposited on the metallic substrate.

14. A method as claimed in claim 10 in which the metallic substrate is a previously applied weld deposit on a metallic substrate, the weld deposit is deposited on the previously applied weld deposit.

15. A method as claimed in claim 14 in which the previously applied weld deposit is on an edge surface of the shroud of a turbine blade.

16. A method as claimed in claim 15 in which the turbine blade is premachined before the first weld deposit is deposited on the turbine blade.

17. A method as claimed in claim 14 in which the thickness of the previously applied weld deposit is at least 0.4 mm.

18. A method as claimed in claim 17 in which the total thickness of the previously applied weld deposit and the weld deposit is at least 1.0 mm.

19. A method as claimed in claim 10 in which the thickness of the weld deposit is at least 1.0 mm.

20. A method as claimed in claim 10 in which the metallic substrate comprises nickel or nickel alloy.

21. A method as claimed in claim 10 in which the weld deposit comprises a cobalt alloy.

22. A method as claimed in claim 1 in which the weld deposit seals a hole in the metallic substrate, the weld deposit being metallurgically bonded to the metallic substrate.

23. A method as claimed in claim 22 in which the metallic substrate comprises a turbine blade or a turbine vane having cooling passages, the cooling passages being sealed by the weld deposit.

24. A method as claimed in claim 23 in which the turbine blade or turbine vane comprises nickel or a nickel alloy.

25. A method as claimed in claim 24 in which the metal welding member comprises nickel or a nickel alloy.

* * * * *